(12) United States Patent
Liebenow

(10) Patent No.: US 6,665,314 B1
(45) Date of Patent: Dec. 16, 2003

(54) WIRELESS PRINTER ADJUNCT

(75) Inventor: Frank Liebenow, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/419,996

(22) Filed: Oct. 18, 1999

(51) Int. Cl.⁷ .............................................. H04L 12/43
(52) U.S. Cl. .................. 370/477; 347/395.42
(58) Field of Search ..................... 370/395.4, 395.42, 370/401, 444, 458, 463, 468, 477, 493, 494, 495, 345, 347; 375/222

(56) References Cited

U.S. PATENT DOCUMENTS

| | | | |
|---|---|---|---|
| 2,974,281 A | 3/1961 | Feldman ................... 324/77 |
| 3,833,884 A | 9/1974 | Bigbie et al. ............... 340/147 |
| 4,330,858 A | 5/1982 | Choquet .................... 370/111 |
| 4,707,831 A | * 11/1987 | Weir et al. ................. 370/416 |
| 4,750,165 A | 6/1988 | Champagne et al. ......... 370/24 |
| 5,121,385 A | 6/1992 | Tominaga et al. ........... 370/80 |
| 5,357,543 A | 10/1994 | Hinokimoto ................ 375/10 |
| 5,757,801 A | * 5/1998 | Arimilli ..................... 370/444 |
| 5,812,534 A | * 9/1998 | Davis et al. ................ 370/468 |
| 5,966,375 A | * 10/1999 | Kagaya ...................... 370/477 |

* cited by examiner

Primary Examiner—Dang Ton
Assistant Examiner—Frank Duong
(74) Attorney, Agent, or Firm—Scott Charles Richardson; Walter J. Malinowski; Suiter-West PC LLO

(57) ABSTRACT

A method and system for managing the transmission of data having variable priority over a transmission link are disclosed. Higher and lower priority data share a common transmission link such as a wireless communications network. Lower priority data such as a printing job does not interrupt or delay the transmission of higher priority data such as modem communications. When data to be transmitted is received by a transmitting device, a determination is made whether the data is higher or lower priority data. Higher priority data is transmitted, and lower priority data is saved in a memory for transmission during a lower priority time period. Errors occurring during the transmission of lower priority data are also saved for retransmission during a lower priority time period. A computer-based information handling system sends data to be transmitted to a transmitter for transmitting data over the transmission link. A receiver receives the data and sends the data to a remote device coupled to the receiver. Lower priority data such as printer data is adjunct to higher priority data such as modem data for the same transmission line or link.

14 Claims, 3 Drawing Sheets

WIRELESS PRINTER ADJUNCT

FIELD OF THE INVENTION

The present invention generally relates to the field of computer-based information handling systems, and particularly to a method and system for managing data transmission.

BACKGROUND OF THE INVENTION

It is often desirable to provide a communications link between a computer-based information handling system and a remote device or another computer-based information handling system. Such a communications link may comprise a direct link transmission line or network, or a wireless link or network. For example, a first information handling system may transmit data over a transmission link to a remote information handling system via a modem or similar communications device. Often, the data is transmitted during a higher priority time period such that no interruption or delay in the transmission is desired. While the data is transmitted during a higher priority time period, the first information handling system may have lower priority data such as a printing job to be sent during data transmission to be received by a remote device such as a printer or the second computer-based information handling system. The lower priority printer data is therefore adjunct to the higher priority modem data.

Prior art systems typically batch the print job to be sent immediately after completion of the data transmission, or time-division multiplex the data by integrating packets of the lower priority print job data with packets of the higher priority data at periodic intervals. However, batching of data transmissions does not account for the priority of data transmission since data is transmitted on a first in, first out (FIFO) basis. Thus, transmission of higher priority data may be delayed behind the transmission of lower priority data merely if the lower priority data were received to be transmitted prior to the higher priority data. Batching of data at the receiving end of most networks requires a computer system disposed at the receiving end of the transmission link to manage the batching of incoming data. However, such additional computer systems are typically unavailable or non-existent. Further, time-division multiplexing of lower priority data with high priority data introduces delay in the transmission of higher priority data or requires a higher bandwidth transmission line. Typically, the bandwidth of the transmission line is limited and cannot accommodate simultaneous transmission of both higher priority and lower priority data. It would therefore be desirable to be able to control the transmission of higher and lower priority data without interrupting or delaying higher priority data transmissions.

SUMMARY OF THE INVENTION

The present invention is directed to a method for managing the transmission of data having variable priority over a transmission link. In one embodiment, the method includes the steps of receiving data to be transmitted over the transmission link, determining whether the data to be transmitted is higher priority data, transmitting the data over the transmission link in the event the data is determined to be higher priority data, saving the data in a memory until a lower priority time period in the event the data is not determined to be higher priority data, determining whether the present time period is a lower priority time period, transmitting the data saved in the memory over the transmission link in the event the present time period is determined to be a lower priority time period and there is no higher priority data remaining to be transmitted, and otherwise repeating the step of receiving data to be transmitted over the transmission link. The method may be tangibly embodied on a computer readable medium whose contents cause a computer-based information handling system to execute the method.

The present invention is also directed to a system for managing the transmission of data having variable priority over a transmission link. In one embodiment, the system includes a computer-based information handling system, a first device for interfacing with the transmission link and transmitting data from the computer-based information handling system over the transmission link, a second device for interfacing with the transmission link and receiving data transmitted over the transmission link, and a remote device coupled to the second device for receiving data from the second device that is transmitted over the transmission link.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
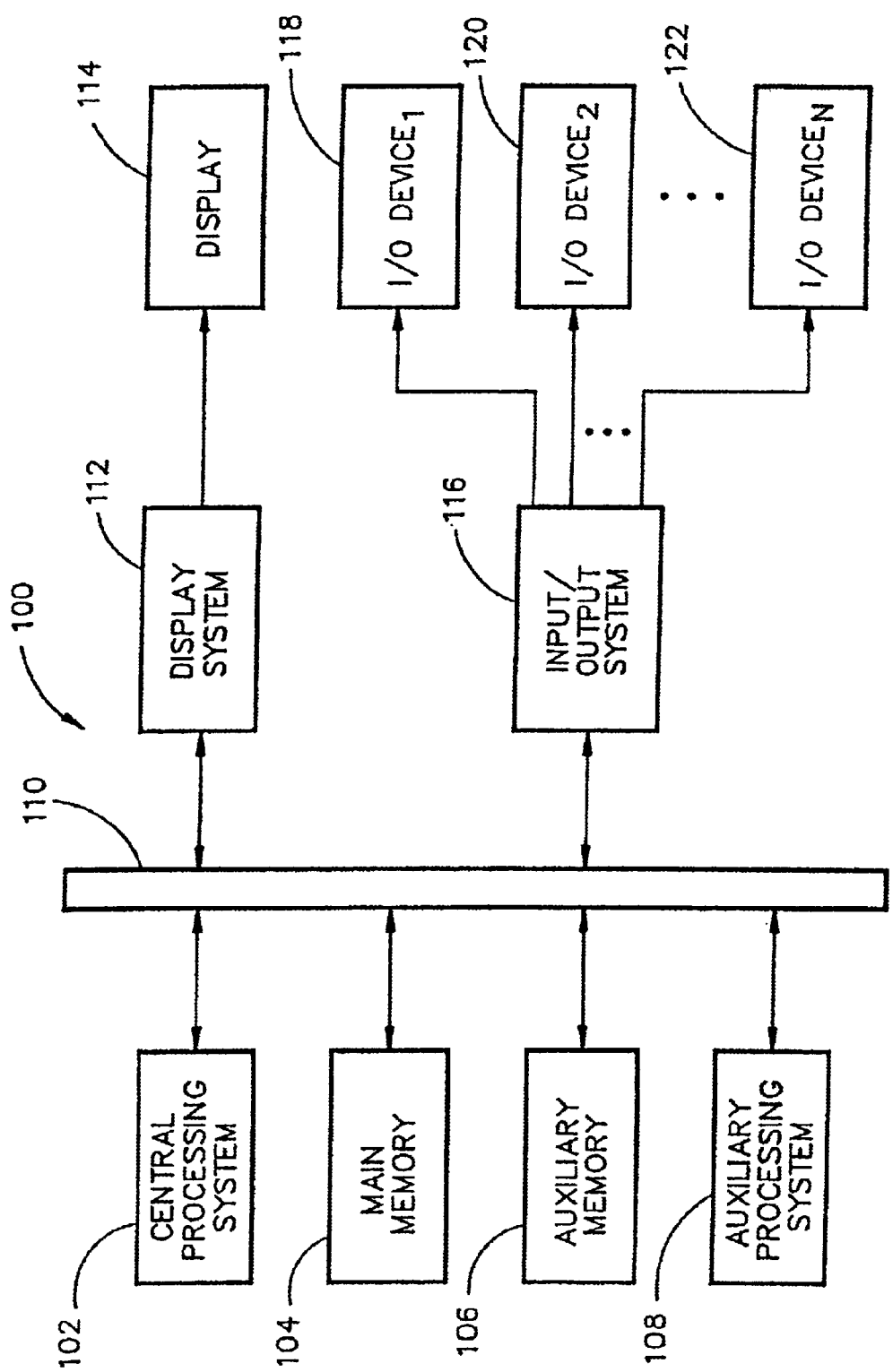
FIG. 1 is a block diagram of a computer-based information handling system operable to embody present invention.

Referring now to FIG. 1, a hardware system in accordance with the present invention is shown. The hardware system shown in FIG. 1 is generally representative of the hardware architecture of a computer-based information handling system of the present invention. A central processing system 102 controls the hardware system 100. Central processing system 102 includes a central processing unit such as a microprocessor or microcontroller for executing programs, performing data manipulations and controlling the tasks of hardware system 100. Communication with central processor 102 is implemented through a system bus 110 for transferring information among the components of hardware system 100. Bus 110 may include a data channel for facilitating information transfer between storage and other peripheral components of the hardware system. Bus 110 further provides the set of signals required for communication with central processing system 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of hardware system 100 include main memory 104, auxiliary memory 106, and an auxiliary processing system 108 as required. Main memory 104 provides storage of instructions and data for programs executing on the central processing system 102. Main memory 104 is typically semiconductor based memory such as dynamic random access memory (DRAM) and or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Hardware system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Hardware system 100 further includes a display system 112 for connecting to a display device 114, and an input/output (I/O) system 116 for connecting to one or more I/O devices 118, 120 up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between the one or more I/O devices 118–122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118–122 may provide or receive analog or digital signals for communication between hardware system 100 of the present invention and external devices, networks, or information sources. Input/output system 116 and I/O devices 118–122 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, IEEE 802.11 for wireless networks and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of hardware system 100 of FIG. 1 by one having ordinary skill in the art would not depart from the scope or the spirit of the present invention.

Figure 2:
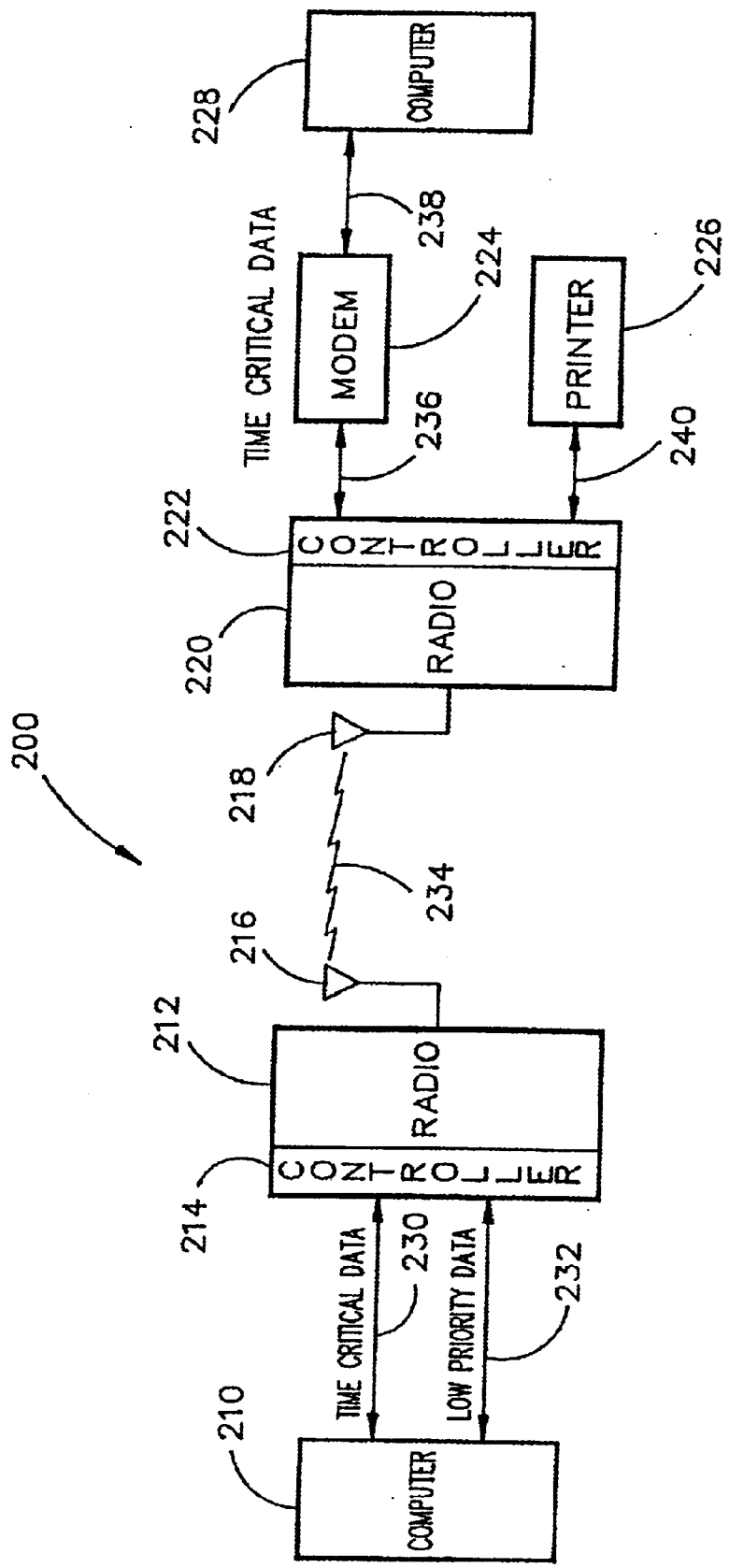
FIG. 2 is a block diagram of a wireless data communications and transmission system including a printer and a modem in accordance with the present invention.

Referring now to FIG. 2, a wireless data communications and transmission system in accordance with the present invention is shown. The data transmission system 200 comprises a computer-based information handling system 210 having hardware substantially similar to computer-based information handling system 100 described with respect to FIG. 1. Typically, data transmission system 200 is a wireless system whereby data may be transmitted from computer system 210 to a device at a remote location capable of receiving wireless data transmissions. In such a wireless data transmission system, computer system 210 interfaces with a controller 214 coupled to a wireless transmission device such as a radio 212 in the case where the wireless transmission system utilizes radio-frequency (RF) communications signals. Alternatively, radio 212 may be substituted with other types of wireless communications devices such as an infrared communications device, for example. Radio 212 includes an antenna 216 for facilitating radiation of a radio-frequency communications signal 234. Radio 212 may comprise a transmitter or transceiver adapted to transmit or to transmit and receive a radio-frequency data signal.

A radio-frequency data communications signal 234 is transmitted from radio 212 and received by an operably disposed radio 220 that is substantially similar to radio 212. Radio-frequency data communications signals received by radio 220 are decoded by a controller 222 coupled to radio 220. Radio 220 may comprise a receiver or a transceiver adapted to receive or to transmit and receive a radio-frequency data signal. Controller 222 may connect with a modem 224 via link 236, which in turn may connect with a second computer system via link 238. The received data may be thereby transmitted to a second computer system 228 via modem 224, or, if the received data is a print job, the data may be sent to a printer 226 vial link 240 for printing. A wireless communications network is thus described for transmitting both modem data to modem 224 and printer data to printer 226 via wireless transmission link 234.

Figure 3:
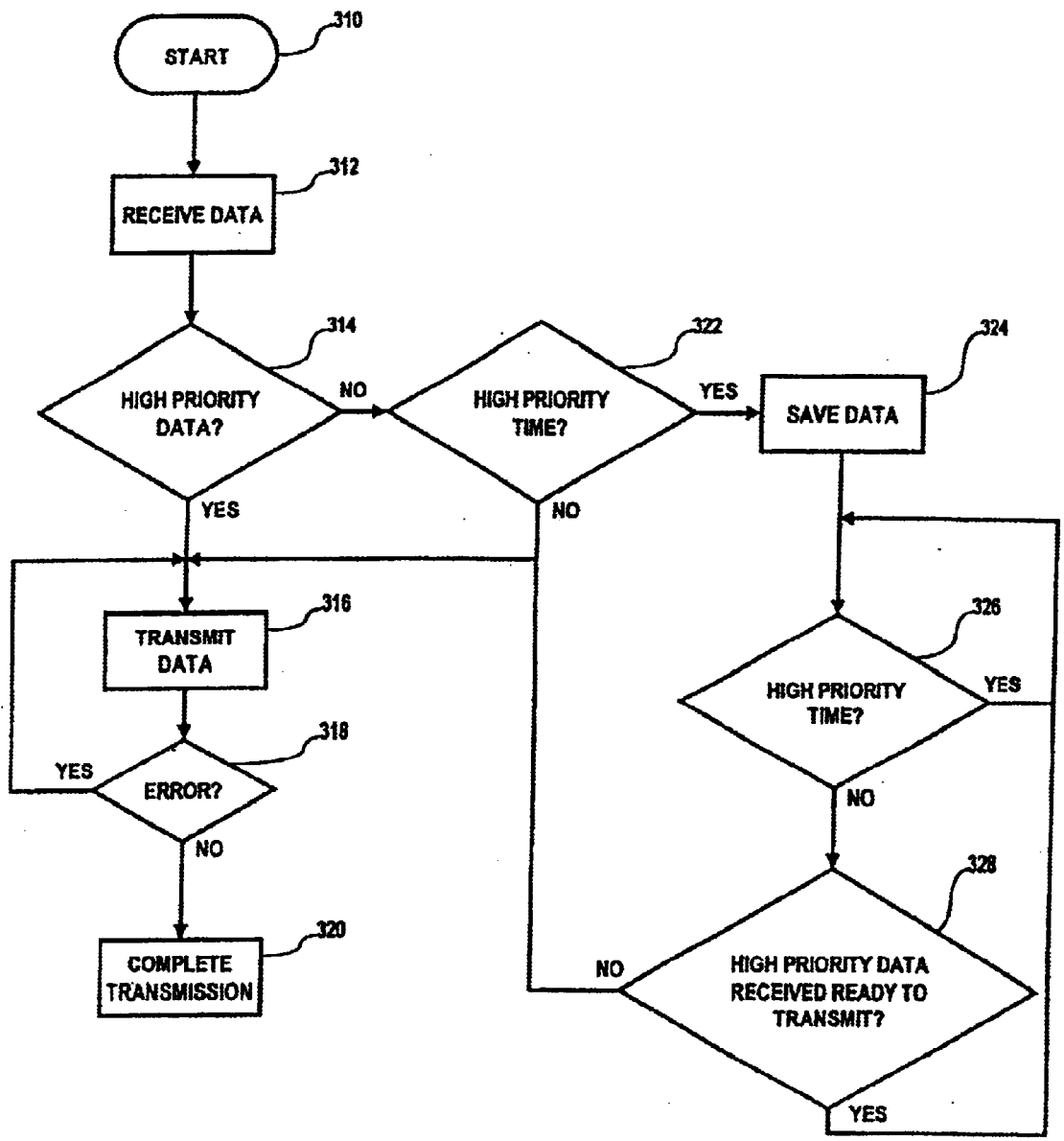
FIG. 3 is a flow diagram of a data transmission management method in accordance with the present invention.

In operation of data transmission system 200, time critical data 230 having a higher priority status may be transmitted via transmission link 234 to a remote device such as computer system 228. Time critical data 230 has a higher priority status in that no delay or interruption in the transmission of the data is desired. Additionally, low priority data 232 having a lower priority status may be transmitted via transmission link 234 to a remote computer or other device, e.g., printer 226. Low priority data has a lower priority status in that a delay or interruption in the transmission of data is not critical and is therefore tolerated. For example, while time critical data 230 such as communications with computer system 228 via modem 224 is being transmitted via transmission link 234, an attempt to transmit low priority data 232 may occur. Such low priority data 232 may comprise a print job sent to printer 226. Transmission link 234 typically has a fixed bandwidth that may not be able to accommodate transmission of both time critical data 230 and low priority data 232 simultaneously. Under such circumstances, low priority data 232 is not transmitted. Rather, the low priority data 232 is saved in a memory device of computer system 210. For example, such a memory device may comprise either main memory 104 or auxiliary memory 106 of computer-based information handling system 100 as discussed with respect to FIG. 1. Normally, time critical data 230 is transmitted during a higher priority time period. If there are any transmission errors occurring in the transmission of high priority, time critical data 230, the data corresponding to the transmission errors is saved and retransmitted. Referring now to FIG. 3, a flow diagram illustrating a method for managing data transmission in accordance with the present invention is shown. The method 300 is implemented by communications system 200 of FIG. 2 and is discussed with reference thereto. Method 300 commences 310 by receiving data to be transmitted 312 via transmission link 234. A determination is made whether the data to be transmitted is higher priority data at step 314. If the data is higher priority data, then it is transmitted at step 316. If, however, the data is not higher priority data, then if the time is determined in step 322 not to be higher priority time 322, the data is transmitted at step 316. For lower priority data, however, if the time is higher priority time, the data is saved for later transmission at step 324. For data so saved, inquiry is periodically made as to whether the time is still higher priority time at step 326. If the time is no longer higher priority time, then a determination is made at step 328 if there remains higher priority data received 315 that is ready to be transmitted at step 316. At lower priority times as determined at step 326, when there is no higher priority data to be transmitted as determined in step 328, lower priority data saved at step 324 is sent for transmission at step 316. For either lower or higher priority data sent for transmission at step 316, error checking is performed at step 318, to determine, for example, whether the transmission of a data packet is complete. Erroneous data is retransmitted at step 316. Data for which no error is detected completes transmission at step 320.

Thus, lower priority data is withheld from transmission during the transmission of higher priority, time critical data. Lower priority data and transmission errors of high priority data are transmitted during lower priority time periods. The default time period may be set by system 200 as a lower priority time period so that if the only data to be transmitted at any given time is lower priority data, then the lower priority data is immediately transmitted. The higher priority time period may be set as any time during which higher priority data is received to be transmitted, is being transmitted, or is expected to be received or transmitted. At the completion of transmission of all higher priority data, the status of the time period may be reset to a lower priority status.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the wireless printer adjunct of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for managing the transmission of data having variable priority over a transmission link, comprising:
   receiving data to be transmitted over the transmission link;
   determining whether the data to be transmitted is higher priority data;
   transmitting the data over the transmission link in the event the data is determined to be higher priority data;
   saving the data in a memory until a lower priority time period in the event the data is not determined to be higher priority data;
   determining whether the present time period is a lower priority time period;
   transmitting the data saved in the memory over the transmission link in the event the present time period is determined to be a lower priority time period; and
   otherwise repeating said receiving step.

2. A method as claimed in claim 1, wherein said step of transmitting the data over the transmission link in the event the data is determined to be higher priority data includes the steps of determining whether a transmission error occurs, and saving the data associated with the transmission error in a memory for retransmission during a lower priority time period in the event a transmission error occurs.

3. A method as claimed in claim 1, wherein said step of transmitting the data saved in the memory over the transmission link in the event the present time period is determined to be a lower priority time period includes the steps of determining whether a transmission error occurs, and retransmitting the data saved in memory over the transmission link in the event a transmission error occurs.

4. A method as claimed in claim 1, wherein the transmission link comprises a network.

5. A method as claimed in claim 1, wherein the transmission link comprises a radio-frequency transmission link.

6. A method as claimed in claim 1, wherein data determined not to be higher priority data includes printer data.

7. A method as claimed in claim 1, wherein data determined to be higher priority data includes modem data.

8. A computer readable medium whose contents cause a computer-based information handling system to perform method steps for managing the transmission of data having variable priority over a transmission link, the method steps comprising:

receiving data to be transmitted over the transmission link;

determining whether the data to be transmitted is higher priority data;

transmitting the data over the transmission link in the event the data is determined to be higher priority data;

saving the data in a memory until a lower priority time period in the event the data is not determined to be higher priority data;

determining whether the present time period is a lower priority time period;

transmitting the data saved in the memory over the transmission link in the event the present time period is determined to be a lower priority time period; and otherwise repeating said receiving step.

9. A computer readable medium as claimed in claim 8, wherein said step of transmitting the data over the transmission link in the event the data is determined to be higher priority data includes the steps of determining whether a transmission error occurs, and saving the data associated with the transmission error in a memory for retransmission in the event a transmission error occurs.

10. A computer readable medium as claimed in claim 8, wherein said step of transmitting the data saved in the memory over the transmission link in the event the present time period is determined to be a lower priority time period includes the steps of determining whether a transmission error occurs, and retransmitting the data saved in memory over the transmission link in the event a transmission error occurs.

11. A computer readable medium as claimed in claim 8, wherein the transmission link comprises a network.

12. A computer readable medium as claimed in claim 8, wherein the transmission link comprises a radio-frequency transmission link.

13. A computer readable medium as claimed in claim 8, wherein data determined not to be higher priority data includes printer data.

14. A computer readable medium as claimed in claim 8, wherein data determined to be higher priority data includes modem data.

* * * * *